United States Patent
Veiga (10) Patent No.: US 6,770,578 B2
(45) Date of Patent: *Aug. 3, 2004

(54) LAMINATED TEXTILE FABRICS FOR USE IN AIR HOLDING VEHICLE RESTRAINT SYSTEMS

(75) Inventor: Manuel J. Veiga, Tewksbury, MA (US)

(73) Assignee: Bradford Industries, Inc., Lowell, MA (US)

( * ) Notice: Subject to any disclaimer, the term of this patent is extended or adjusted under 35 U.S.C. 154(b) by 173 days.

This patent is subject to a terminal disclaimer.

(21) Appl. No.: 10/038,207

(22) Filed: Jan. 4, 2002

(65) Prior Publication Data

US 2002/0145276 A1 Oct. 10, 2002

Related U.S. Application Data

(63) Continuation-in-part of application No. 09/921,979, filed on Aug. 3, 2001, and a continuation-in-part of application No. 09/327,245, filed on Jun. 7, 1999, now abandoned, and a continuation-in-part of application No. 09/493,628, filed on Jan. 28, 2000, now Pat. No. 6,458,724, which is a continuation-in-part of application No. 09/327,243, filed on Jun. 7, 1999, now Pat. No. 6,239,046, and a continuation-in-part of application No. 09/327,244, filed on Jun. 7, 1999, now abandoned, which is a continuation of application No. 09/956,639, filed on Sep. 19, 2001, application No. 10/038,207, which is a continuation-in-part of application No. 09/956,639, filed on Sep. 19, 2001, which is a continuation of application No. 09/327,244, filed on Jun. 7, 1999, now abandoned, and a continuation-in-part of application No. 09/956,640, filed on Sep. 19, 2001, which is a continuation of application No. 09/327,245, filed on Jun. 7, 1999, now abandoned.

(60) Provisional application No. 60/293,613, filed on May 25, 2001.

(51) Int. Cl.$^7$ .............................................. B32B 27/02

(52) U.S. Cl. ...................... 442/164; 3/383; 106/287.13; 106/287.14; 106/287.16; 139/384 R; 139/389; 139/387 R; 139/410; 280/728.1; 280/729; 280/733; 280/748.1; 428/34.1; 428/35.2; 428/35.9; 428/36.1; 428/36.91; 428/101; 428/166; 442/76; 442/149; 442/168; 442/169; 442/182; 442/203; 442/286

(58) Field of Search ......................... 3/383; 106/287.13, 106/287.14, 287.16; 139/384 R, 389, 387 R, 410; 280/728.1, 729, 733, 748.1; 428/34.1, 34.3, 34.6, 35.2, 35.9, 36.1, 36.91, 101, 166; 442/76, 164, 168, 169, 182, 203, 286

(56) References Cited

U.S. PATENT DOCUMENTS 3,970,328 A 7/1976 Wallsten (List continued on next page.)

FOREIGN PATENT DOCUMENTS

WO WO 00/78578 A1 12/2000

OTHER PUBLICATIONS

Publication of Clark–Schwebel Joint Ventures, C–S Integlas A.G., title page, Clark–Schwebel description page, contents, disclaimer page.
Parameters for Woven Fabric Selection (2 pages).

Primary Examiner—Arti R. Singh
(74) Attorney, Agent, or Firm—Hollander Law Firm, P.L.C.

(57) ABSTRACT

A multi-layered woven side air curtain has pre-configured air holding cavities and a polymeric film laminated thereto. An adhesive polyether polyurethane or polyester polyurethane prime coat layer is first coated onto a textile substrate, and then a polymeric film, such as polyamide, polyolefin, or polyurethane is laminated thereto. The textile substrate may be woven of nylon, polyester, or other synthetic fibers. According to an alternative embodiment, a multi-layered composite film product is disclosed that can be used as a film laminate without the need for a prime coat adhesive layer being first applied to the textile substrate. In such a case, the adhesive prime coat is applied to the textile substrate in a single step via the film laminate itself. The side air curtain can be pre-configured or prefabricated to numerous varied designs and shapes prior to coating.

48 Claims, 3 Drawing Sheets

U.S. PATENT DOCUMENTS

| | | |
|---|---|---|
| 4,143,197 A | 3/1979 | Jasionowicz et al. |
| 4,284,682 A | 8/1981 | Frosch et al. |
| 4,560,611 A | 12/1985 | Naka et al. |
| 5,110,666 A | 5/1992 | Menzel et al. |
| 5,178,938 A | 1/1993 | Magistro et al. |
| 5,226,671 A | 7/1993 | Hill |
| 5,240,765 A | 8/1993 | Takahashi et al. |
| 5,254,621 A | 10/1993 | Inoue et al. |
| 5,258,211 A | 11/1993 | Momii et al. |
| 5,298,317 A | 3/1994 | Takahashi et al. |
| 5,316,336 A | 5/1994 | Taguchi et al. |
| 5,399,402 A | 3/1995 | Inoue et al. |
| 5,514,431 A | 5/1996 | Shimomura |
| 5,529,837 A | 6/1996 | Fujiki et al. |
| 5,630,620 A | 5/1997 | Hirai et al. |
| 5,632,057 A | 5/1997 | Lyden |
| 5,647,079 A | 7/1997 | Hakamiun et al. |
| 5,650,207 A | 7/1997 | Crouch |
| 5,651,395 A | 7/1997 | Graham et al. |
| 5,704,402 A | 1/1998 | Bowen et al. |
| 5,707,711 A | 1/1998 | Kitamura |
| 5,721,046 A | 2/1998 | Shrewsburg |
| 5,845,935 A | 12/1998 | Enders et al. |
| 5,863,644 A | 1/1999 | Bonigk et al. |
| 5,881,776 A | 3/1999 | Beasley, Jr. |
| 5,906,391 A | 5/1999 | Weir et al. |
| 5,921,287 A | 7/1999 | Bowen et al. |
| 6,037,279 A | 3/2000 | Brookman et al. |
| 6,042,141 A | 3/2000 | Welch et al. |
| 6,056,316 A | 5/2000 | Yamaji et al. |
| 6,073,961 A | 6/2000 | Bailey et al. |
| 6,113,141 A | 9/2000 | Baker |
| 6,149,194 A | 11/2000 | Breed et al. |
| 6,152,481 A | 11/2000 | Webber et al. |
| 6,168,191 B1 | 1/2001 | Webber et al. |
| 6,169,043 B1 | 1/2001 | Li |
| 6,176,515 B1 | 1/2001 | Wallner et al. |
| 6,177,365 B1 | 1/2001 | Li |
| 6,177,366 B1 | 1/2001 | Li |
| 6,199,898 B1 | 3/2001 | Masuda et al. |
| 6,200,915 B1 | 3/2001 | Adams et al. |
| 6,220,309 B1 | 4/2001 | Sollars, Jr. |
| 6,239,046 B1 | 5/2001 | Veiga et al. |
| 6,250,668 B1 | 6/2001 | Breed et al. |
| 6,270,113 B1 | 8/2001 | Wipasuramonton et al. |
| 6,294,487 B1 | 9/2001 | Keshavaraj |
| 6,344,251 B1 | 2/2002 | Keshavaraj et al. |
| 6,348,543 B1 | 2/2002 | Parker |
| 6,350,709 B1 | 2/2002 | Veiga |
| 6,364,356 B1 | 4/2002 | Keshavaraj |
| 6,429,155 B1 | 8/2002 | Li et al. |
| 2001/0005660 A1 | 6/2001 | Li et al. |
| 2001/0009829 A1 | 7/2001 | Soliars, Jr. et al. |
| 2001/0042980 A1 | 11/2001 | Soliars, Jr. |
| 2001/0049243 A1 | 12/2001 | Crouch et al. |
| 2002/0041941 A1 | 4/2002 | Ritter |

LAMINATED TEXTILE FABRICS FOR USE IN AIR HOLDING VEHICLE RESTRAINT SYSTEMS

CROSS REFERENCE TO RELATED APPLICATIONS

This application is a continuation-in-part of application Ser. No. 09/921,979, filed Aug. 3, 2001, published Nov. 28, 2002 as Publication No. 2002/0175510 A1, which claims priority of provisional application Ser. No. 60/293,613, filed May 25, 2001, said application Ser. No. 09/921,979 also being a continuation-in-part of application Ser. No. 09/327,245, filed Jun. 7, 1999, now abandoned, and a continuation-in-part of application Ser. No. 09/493,628, filed Jan. 28, 2000, now U.S. Pat. No. 6,458,724, which is a continuation-in-part of application Ser. No. 09/327,243, filed Jun. 7, 1999, now U.S. Pat. No. 6,239,046, and application Ser. No. 09/327,244, also filed Jun. 7, 1999, now abandoned in favor of continuation application Ser. No. 09/956,639, filed Sep. 19, 2001, published Feb. 21, 2002 as Publication No. 2002/0022420 A1; this application is also a continuation-in-part of application Ser. No. 09/956,639, filed Sep. 19, 2001, published Feb. 21, 2002 as Publication No. 2002/0022420 A1, which is a continuation of said application Ser. No. 09/327,244, filed Jun. 7, 1999, now abandoned; this application is also a continuation-in-part of copending application Ser. No. 09/956,640, filed Sep. 19, 2001, published Dec. 12, 2002 as Publication No. 2002/0187696 A1, which is a continuation of application Ser. No. 09/327,245, filed Jun. 7, 1999, now abandoned. All of these parent applications are fully incorporated by reference herein and made a part of this disclosure.

BACKGROUND OF THE INVENTION

1. Field of the Invention

This invention relates to automotive protective devices such as inflatable air bags, side air curtains, or the like. More particularly, the invention relates to laminated woven and non-woven textile fabrics, including those with and without pre-configured air holding cavities, also referred to as one-piece woven (OPW), for use in side air curtains. The invention also provides a composite film product having adhesive and sealing properties useful in the manufacture of these related products and a method of manufacturing said composite film product.

2. Description of the Related Art

Currently available safety restraint devices for automotive vehicles include driver and passenger side air bags that are rapidly inflated by a gas—commonly referred to as "air"—which is produced by the ignition of a pyrotechnic material at the moment a collision begins. These devices provide a protective barrier between the vehicle occupants and the vehicle structure. Much of the impact of a collision is absorbed by the air bag, thus preventing or substantially lessening the possibility of serious bodily injury to the vehicle occupants. Air bags are typically stored in a collapsed, folded condition in the steering wheel to protect the driver, and in the dashboard to protect a front seat passenger. The automotive industry has recently introduced side air bags that are stored in the back of the front seats or in the rear seats to protect the cabin occupants in the event of a collision occurring on either side of the vehicle. More recently still, a further safety feature that has been made available for passenger vehicles, especially light trucks, sport utility vehicles (SUVs) and minivans, is the side-impact protective inflatable side air curtain that is designed to provide a cushioning effect in the event of side collisions or rollover accidents. These side air curtains are stored uninflated along the roof of the vehicle or in one of the main support pillars of the vehicle. In the event of a collision the side air curtain deploys along the interior side walls of the vehicle cabin, protecting the occupants from serious bodily injury from contact with the vehicle structure (support pillars, etc.) and from broken glass. They must also be designed to prevent the passengers from being thrown from the vehicle in rollover conditions, which is one of the principal dangers in an SUV accident.

Each of these various types of air bags has different design and physical property requirements, such as gas (air) holding ability or, alternatively, permeability, air pressure and volume, and puncture resistance. For example, the driver side and front passenger side air bags, which deploy in about 0.06 seconds, require very little or no gas retention ability since they are designed to inflate and then to deflate almost immediately after inflation. Passenger side air bags require a controlled permeability, which enables them to lose air more gradually, but still remain inflated for only a few seconds. Side air curtains, on the other hand, must retain air pressure and volume for relatively longer periods of time than other types of air bags to protect cabin occupants in rollover accidents, which can take up to 10 seconds or more to complete. Additionally, to be commercially acceptable, all vehicle air restraint devices must have superior package-ability and anti-blocking properties, which permits them to be packed into a relatively small space, such as within a steering wheel or a vehicle support pillar, and to deploy instantaneously when needed without the material sticking to itself after being stored for relatively long periods of time, perhaps even years. These and other physical properties are determined in large part by the type of fabric and weave used in the air bag, whether the fabric is knitted, woven or non-woven, and, importantly, the nature of the coatings that are used on the fabric. Coatings of various types are used to seal the fabric of the air bag and make it air holding.

Wherever coated fabrics are used, considerations such as controlling air permeability, air pressure, and volume exist. Adhesion of the coating material to the textile fabric substrate also presents a serious problem that must be addressed. For example, it is generally more difficult to obtain strong adhesion of a coating material to textile fabrics having a smoother surface than it is with fabrics having a rougher surface. Radio frequency (RF) heat sealing techniques cannot be used with some coatings such as silicone rubber (polysiloxane) to form the air bag because this material will not flow at RF heat sealing temperatures. In such cases, air bags are usually made by stitching, a process that will frequently require the addition of an adhesive sealant in the stitched areas to prevent leakage of air. Even with such adhesive sealants, however, some leakage of air occurs at the stitching, which lessens the protective capability of the air bag.

The air holding capability of a side air curtain is critical since it must remain inflated for extended periods of time to protect passengers in automotive accidents involving multiple rollovers. Unlike driver side and passenger side air bags, which are designed to inflate instantaneously and to deflate almost immediately after inflation to avoid injury to the driver and front seat passenger, a side air curtain must be capable of remaining inflated for from about 3 to about 12 seconds, depending upon the size of the air curtain and the size and type of vehicle involved. An average passenger vehicle would require a side air curtain of from about 60 inches to about 120 inches in length measured along the side of the vehicle. A larger vehicle, such as a minivan, would require an even longer side air curtain. The inflation period of a side air curtain should be sufficient to protect the cabin occupants during at least three rollovers, the maximum usually experienced in such incidents.

Side air curtains are also designed to be configured to different sizes and shapes depending upon the type of vehicle in which they are to be deployed. Thus, the size and shape of the air curtain will vary depending upon the make and type of vehicle. For example, a minivan is likely to require a different configuration of side air curtain than an SUV. The distance and location of the vehicle's support pillars and the height of the vehicle must also be taken into consideration when designing an air curtain. Since side air curtains are relatively large in comparison with driver or passenger side air bags, the gas pressure available for their expansion, which is limited in volume by the amount of pyrotechnic material available, must also be effectively employed. This is accomplished by designing side air curtains that have air holding cavities only where they are needed to protect the passengers. Those areas where no protection is required have no air holding cavities, thus reducing the volume of gas required to inflate the device to the desired pressure. When side air curtains are deployed they may be subjected to extreme pressures within a relatively broad range depending upon their specific location or application. Air bag deployment pressures generally range from about 50 kilopascals (Kpa) to about 450 Kpa, which corresponds generally to a range of from about 7.4 pounds per square inch (psi) to about 66.2 psi. Accordingly, there is a need for fabric products and methods of construction for air bags that are versatile both in terms of accommodating the demand for varied sizes and shapes, and which will also be relatively light weight and relatively impermeable to fluids under such anticipated pressures.

Typically, an air bag is constructed by joining two or more woven textile fabrics, each of which has been pre-coated with a sealing material to maintain air pressure when the bag is inflated. The pre-coated fabric is configured to the desired shape as, for example, by cutting, and the separate pieces are then sewn or welded together. Frequently, they are both sewn and welded for strength and air holding purposes. Air holding capability in vehicle restraint devices has been accomplished through the application of coatings such as chloroprene and silicone rubber to a textile fabric (e.g., nylon). Menzel, U.S. Pat. No. 5,110,666 discloses a woven nylon fabric coated with polyurethane to provide the desired permeability and retention of inflation gas. Improved polyurethane, acrylic, polyamide, and silicone coatings that are coated in layers on the fabrics have recently been developed. It has been found that adhesion and heat sealing characteristics are greatly improved with such layered coatings. Examples of such coated fabrics and methods of coating such fabrics are disclosed in commonly assigned applications Ser. Nos. 09/327,244 and 09/327,245, filed Jun. 7, 1999, now abandoned in favor of continuation applications Ser. No. 09/956,639, filed Sep. 19, 2001, published Feb. 21, 2002 as Publication No. 2002/0022420 A1, and Ser. No. 09/956,640, filed Sep. 19, 2001, published Dec. 12, 2002 as Publication No. 2002/0187696 A1, respectively, and U.S. Pat. No. 6,239,046, issued May 29, 2001, the disclosures of which are incorporated herein by reference and made a part of this disclosure. Another example of a greatly improved bonding system is a polyurethane epoxy resin and polysiloxane beaded heat seal, which is disclosed in copending commonly assigned application Ser. No. 09/452,030, filed Nov. 30, 1999, now U.S. Pat. No. 6,350,709, which is incorporated herein by reference and made a part of this disclosure. Further developments in air bag technology are disclosed in commonly assigned copending applications, Ser. No. 09/459,768, filed Dec. 13, 1999, now abandoned, in which the inflatable safety device incorporates connective tethers within the restraint device to provide structural support and stiffening when it is inflated, and Ser. No. 09/572,176, filed May 17, 2000, which relates to a sewn fusion seal process for producing air holding vehicle restraint systems such as those disclosed herein, both of which are incorporated herein by reference and made a part of this disclosure.

Shigeta et al., U.S. Pat. No. 5,302,432, discloses a driver side or passenger side air bag, not an air curtain, in which a film of polyolefin resin and a non-woven material is laminated to a woven synthetic fabric, such as nylon. The polyolefin film is laid down on the woven fabric in molten form and, as such, adheres to the fabric. The non-woven material is bonded to the molten resin and forms the outer surface of the device. The purpose of the non-woven material is said to be twofold: to provide for the escape of air after inflation of the bag, and to protect the driver or passenger, as well as the film, from the hot inflation gas. Such a construction would be undesirable in a side air curtain in which air retention at relatively high pressures for relatively long periods of time is required. Further, woven multi-layered textiles which have pre-configured air holding cavities, which would be subject to leakage of the molten film through the fabric when coated and cause sticking, which would impede the deployment of the device when needed. Similarly, Kitamura, U.S. Pat. No. 5,707,711, discloses an air bag, not an air curtain, constructed from a seamless tubular woven fabric to which a polymer resin such as polyurethane is laminated to prevent permeation of gases through the surface of the bag. The resin may be applied as a liquid coating or as a film, which is laminated to the fabric by heat and pressure. However, this prior art does not disclose a method by which a pre-configured multi-layered air bag structure, having the desired shape for use in a particular make and size vehicle, can be laminated in one pass with a coating in film form, thus providing an efficient, cost effective means of producing such a bag.

Instead of sewing or welding pre-configured pieces of coated textile fabric, it is much more economical in terms of cost of production and ease of shipping to weave the side air curtains directly on a Jacquard or Dobby loom to produce a multi-layered woven product having pre-configured air holding cavities and the size and shape curtain desired in the final product. Pre-configured woven side air curtains require minimal cutting and essentially no joining of separate pieces, and are ready for coating as they come off the loom. Since the multi-layered fabric is woven from uncoated yarn, the curtain must be coated after weaving to impart the desired sealing and adhesive properties to the product. The difficulty inherent in coating a pre-configured multi-layered woven product is that the liquid coating material, e.g. polyurethane, can soak through the outer layers of woven fabric and penetrate the interior of the curtain. When this occurs and the coating hardens with heat and pressure, the sides of the curtain will stick together, preventing or substantially hindering the opening of the air pockets and deployment of the curtain when it is needed. Moreover, in order to make the side air curtain impermeable to air, the coatings require large concentrations of polysiloxane or other rubber-like materials. These produce a very heavy and bulky curtain that is not easily folded and stored when not in use. The present invention provides a laminated pre-configured side air curtain, a multi-layered composite film product that can be used in the lamination process, and a novel lamination process for manufacturing the side air curtain.

SUMMARY OF THE INVENTION

This invention relates to an automotive protective device comprising laminated woven and non-woven textile fabrics, including multi-layered woven textiles having pre-configured air holding cavities, also known in the industry as one piece woven (OPW), in which a solid polymeric film is laminated to the outer surfaces thereof to make it air tight to very high pressures for extended periods of time. In the process of making the air curtain of this invention, an adhesive polycarbonate, polyether, or polyester aliphatic polyurethane prime coat layer is first coated onto a textile substrate, and then a solid polymeric film, such as polyamide, polyolefin, polyether, polyester, polycarbonate or polyurethane, is laminated thereto. In one embodiment of the invention, the adhesive prime coat layer is applied to the surface of the textile substrate, which can be woven nylon, polyester, or other synthetic fiber, through rotogravure or direct coating and allowed to dry. A solid polymeric film, such as polyamide, polyether, polyester, polycarbonate, polyolefin or polyurethane film, is then applied to the prime-coated textile substrate by means of hot film lamination, through the use of heat and pressure. In an alternative embodiment of the invention, a multi-layered composite film product is disclosed, which can be used as a film laminate without the need for first applying a prime coat adhesive layer to the textile substrate. In this connection, the adhesive prime coat and the polymeric film laminate are applied to the textile substrate in a single step via the film laminate itself. The methods and products of this invention thus permit an automotive protective device such as a side air curtain to be pre-configured or prefabricated to numerous varied designs and shapes prior to coating which will result in economies of operation and reduce the cost of manufacturing these devices.

DETAILED DESCRIPTION OF THE INVENTION

It has been found that by hot laminating a solid polymeric film of polyamide, polyolefin, polyether, polyester, polycarbonate or polyurethane material to the surface of a woven or non-woven textile substrate, including a single layer or multi-layered woven or non-woven textile substrate having pre-configured air holding cavities, to produce an automotive protective device such as a side air curtain, the protective device will hold air at very high pressures for extended periods of time. The textile substrate can be a woven or non-woven nylon, polyester, or other synthetic fiber, all of which are well known in the art to be useful in the manufacture of air bags and side air curtains. According to the method of the invention, the surface of the textile substrate is first coated with an adhesive prime coat to seal the fabric and provide a base to which an overlying solid polymeric film layer can be laminated. The prime coat material is formulated in the case of a multi-layered textile substrate having pre-configured air holding cavities to be suitable for coating the textile fabric without soaking through to the interior of the air holding cavities and thus causing sticking or blocking, which would prevent its opening when it is activated. In another embodiment of the invention, the polymeric film layer comprises a part of a composite film structure that also includes an adhesive prime coat layer, which eliminates the need for a separate prime coating step.

The adhesive polyurethane prime coat comprises a solution of an aliphatic or aromatic polyester polyurethane or polyether polyurethane based material or a polycarbonate-based aliphatic polyurethane that is compounded with other materials such as heat stabilizers, flame retardants, colorants and blocked isocyanate. The presence of isocyanate is important in the inventive process because when sufficient heat and pressure is applied to the prime coat composition, the isocyanate becomes adhesively activated. At this point in the process, the polyurethane reacts with and adhesively binds the overlying polymeric film layer. The result is a thermoset film-prime coat composite which adheres to the textile fabric, seals it, and makes it air tight and able to withstand high pressures for the relatively long periods of time required of an air curtain.

The polyurethane prime coat is formulated to have a solids content of from about 25% to about 45%, with about 35% solids being preferred, and a tensile strength when in film form of from about 800 psi to about 2500 psi. The tensile strength of the polyurethane prime coat when in film form is an indication that the prime coat formulation is suitable for coating a woven textile fabric for use in the invention. The coating weight of the polyurethane prime coat on the textile fabric can be from about 0.25 ounces per square yard (osy) to about 2.5 osy, with about 1.0 to about 1.2 osy being preferred. In one embodiment of the invention, a multi-layered, woven textile substrate is first coated on both outer sides with a prime coat layer of polyurethane. The liquid prime coat material is laid down substantially evenly over the pre-configured textile substrate, e.g. by a knife over roll process (not shown in the drawings) in a coating line at a temperature elevated sufficiently to evaporate the solvent in the formulation, but without activating the isocyanate. A suitable temperature would be from about 250° F. to about 300° F. to as high as 325° F. It is important that the isocyanate not be activated at this stage in the process because otherwise the prime coat will be prematurely cured and the polymeric film laminate, which is applied at a later stage of the process, will not adhere to the surface of the textile fabric.

Another prime coat adhesive composition comprising a solution of polycarbonate polyurethane, a hot melt polyurethane and an isocyanate, results in greatly improved bonding, heat resistance and heat aging properties in the film-laminated textile fabrics of the invention. The polycarbonate polyurethane provides bonding strength to the adhesive, so that the film laminate will firmly and securely adhere to the textile fabric, even after storage at elevated temperatures for extended periods of time. The hot melt polyurethane acts as an adhesion promoter by enabling the prime coat composition to flow smoothly and completely over the portion of the textile fabric that is to be laminated, thus ensuring a complete sealing of the side air curtain. The isocyanate provides a heat setting or cross linking function to the adhesive composition and serves to bond the film laminate to the fabric as discussed above.

More specifically, the polycarbonate polyurethane component is a polycarbonate polyol-based aliphatic polyurethane. The hot melt component comprises a polyester or polyether-based polyurethane or copolymer blends of ethylene vinyl acetate (EVA). The isocyanate component is a blocked aliphatic HDI isocyanate (hexamethylene diisocyanate), such as the HDI isocyanate manufactured by Bayer Corp. of Pittsburgh, Pa. To this prime coat adhesive composition may be added such additional materials as antibacterial additives, flame retardants, colorants, heat stabilizers and finely ground silica, which serves as a reinforcement for the adhesive material. Silica may be added in amounts of from about 2% to 3% by weight, and may be obtained from the Degussa Corp. of Ridgefield, N.J. as its AEROSIL 380® product.

The polycarbonate polyurethane, hot melt polyurethane, and isocyanate components of the adhesive composition are typically blended in parts-by-weight ratios of 75:25:11, respectively, although this ratio can be adjusted as conditions require. For example, the parts-by-weight ratios of polycarbonate polyurethane to hot melt polyurethane can be adjusted from about 50:50 to about 90:10, respectively. The polycarbonate component provides bonding strength at elevated temperatures and improved heat aging properties. The hot melt component provides superior flow characteristics to the composition. However, too much of the hot melt component can result in reduced strength and heat aging properties, so its relative part-by-weight in the composition has to be adjusted carefully in relation to the polycarbonate polyurethane component of the mixture. The isocyanate component cross links with the polycarbonate and the hot melt components at the temperature and pressure of lamination. In general, the greater the amount of isocyanate present in the composition, the faster the adhesive sets. The part-by-weight ratio of isocyanate in the composition can vary from about 1:15, depending upon how fast it is desired to set the adhesive material. However, it is important that the adhesive prime coat not set or cure before the lamination step in the process.

In the process of laminating the textile fabric, the hot melt polyester polyurethane component is added to the composition in part-by-weight ratios that permit it to flow at temperatures of from about 280° F. to 400° F., and preferably at from about 325° F. to about 340° F., at pressures of from about 40 to about 80 psi pressure, with 60 psi pressure being preferred. This provides for a smoother, more complete surface coverage of the adhesive prime coat, which makes it easier to laminate the solid film laminate to the polycarbonate prime coat. The polycarbonate component increases the heat aging and heat resistance properties of the laminated product when it is exposed to elevated temperatures for extended periods of time. This is of importance in connection with the minimum test levels which these types of safety products must meet. One such requirement is that the adhesion or bonding properties of the film laminates must be maintained at stress points, such as seams, after they have been exposed to elevated temperatures for extended periods of time. For example, when the laminated product is tested at temperatures of from about 70° C. to 75° C., typically it must reach and maintain an internal pressure of at least 40 Kpa when deployed. The polycarbonate polyurethane adhesive composition of this invention meets this test requirement. Moreover, the improved flow characteristics of the hot melt polyurethane in the system also results in increased strength and resistance of the laminated product to the comb stripping test, which measures raveling at the seams.

The lamination processes disclosed herein include both a two-step process in which the textile fabric is first coated with a prime coat adhesive layer and then later laminated with a solid film laminate, and a one-step process using a composite solid film laminate that also includes a layer of adhesive prime coat. In the two-step process, the adhesive prime coat is spread over the textile fabric as a solution that is subsequently evaporated to dryness. It is important at this stage of the process that the prime coat be dried, but not heated sufficiently to be cross-linked or cured. The solid film laminate is then laid over the dried prime-coated textile fabric and laminated with sufficiently high heat and pressure to cross-link or cure the adhesive and set the film laminate to the fabric. For this reason, the prime coat includes a blocked aliphatic HDI isocyanate, which slows the cross-linking mechanism and prevents the polycarbonate polyurethane from prematurely curing prior to the lamination step. In effect, this create sites for cross-linking the adhesive polycarbonate polyurethane to the woven or non-woven textile fabric, while maintaining the availability of adhesive sites to cross-link with the solid polyamide, polyolefin, polyester, polyether, polycarbonate or polyurethane film. The level of adhesion and heat resistance desired in the product obtained and the physical properties thereof can be varied according to the amount of aliphatic HDI isocyanate used in the adhesive prime coat composition. The prime coat polycarbonate or polycarbonate mixtures disclosed herein blend with the isocyanate at temperatures above about 275° F. to 290° F.

To determine the effectiveness of the polycarbonate polyurethane prime coat adhesive compositions of the invention, airbags of one-piece woven nylon were prepared using (1) a polycarbonate adhesive, (2) an adhesive mixture of polycarbonate, hot melt polyurethane and isocyanate, in the parts-by-weight ratio of 75:25:11, as discussed above, and (3) a standard polyether polyurethane adhesive containing no polycarbonate. Airbags film-laminated with these adhesives were inflated to 70 Kpa pressure and stored at various temperatures for various lengths of time to simulate storage conditions for an extended life cycle of about 20 years. They were tested for tensile strength and elongation at their breaking points and air retention over a period of time as well as to determine such heat aging effects as cracking, brittleness, deterioration, softness and flakiness. The results of these tests are shown in the Table below.

TABLE

| Temperature | Physical Properties | Polycarbonate Polyurethane | 75:25:11 Blends | Polyether Polyurethane |
|---|---|---|---|---|
| Room Temp. - approx. 72° F. | Tensile (psi) | 2128 | 1758 | 936 |
| | Elongation (%) | 306 | 485 | 536 |
| 105° C. - 400 Hours | Tensile (psi) | 3364 | 1461 | 434 |
| | Elongation (%) | 302 | 345 | 138 |
| 120° C. - 7 Days | Tensile (psi) | 3501 | 818 | 333 |
| | Elongation (%) | 209 | 204 | 58 |
| 135° C. - 5 Days | Tensile (psi) | 2044 | 1800 | 403 |
| | Elongation (%) | 206 | 220 | 163 |
| Leak Rate - 70 Kpa at Room Temp. | test 1 (Kpa) | 68 | 62 | 57 |
| | test 2 (Kpa) | 67 | 65 | 58 |
| | test 3 (Kpa) | 68 | 62 | 56 |

The results shown in the Table reflect that airbags film-laminated with polycarbonate-based adhesive prime coat compositions, exhibited substantially improved strength, flexibility and air retention at increased temperatures when compared with those laminated with standard polyether polyurethane adhesive compositions. The test results shown in the Table are the averages of five samples of each type of adhesive prime coat and are accurate to about ±10%. The polycarbonate-containing adhesive prime coat compositions of the invention also exhibited superior heat aging and heat resistance properties over standard polyether polyurethane based systems.

As shown in the Table, the tensile strengths in psi of the polyether polyurethane adhesive film samples were reduced by as much as 50% or more as the temperature was increased, while the adhesive polycarbonate-containing samples were higher to begin with and tended substantially to maintained their tensile strengths. Even at room temperature (approx. 72° F.), the adhesives of polycarbonate blends had tensile strengths more than twice that of the polyether polyurethane adhesives at the breaking point of the film. As the temperature and storage times increased, the tensile strengths of the polycarbonate adhesive samples were from approximately 3 to 10 times greater than the polyether polyurethane samples, depending on the percentage of polycarbonate used.

As discussed above, when polycarbonate is mixed with a hot melt polyurethane mixture, the adhesive spreads more evenly and provides better adhesion to the film laminate and also better sealing properties. As the temperature was increased in the test samples, shrinkage in the polyether polyurethane film samples was greater than that in the polycarbonate polyurethane samples, as shown by the percent elongation in the Table. The elasticity of the adhesive laminate was also greater in those samples laminated with the polycarbonate prime coat adhesives than in the standard polyether adhesives. Finally, samples of polycarbonate-containing adhesives retained air pressure more effectively than those with the polyether adhesives, as shown by the leak rate tests. The polyether samples had average leak rates of 19%, while the polycarbonate and polycarbonate blends had average leak rates of approximately 10%. This is a substantial improvement in air retention and indicates that airbags made with the use of polycarbonate-containing adhesives will be better able to fulfill their safety requirements.

In the film lamination step in the process of the invention, a solid polyamide, polyolefin, polyether, polyester, polycarbonate or polyurethane film is laminated to the surface of a prime-coated woven or non-woven textile fabric substrate or to both outer surfaces of a prime-coated, pre-configured, multi-layered woven or non-woven textile substrate to produce a film-textile-film laminate. The polymeric film laminate of the invention has a thickness of from about 0.2 mils to about 5.0 mils, and preferably from about 0.5 mils to about 1.0 mils.

Figure 1:
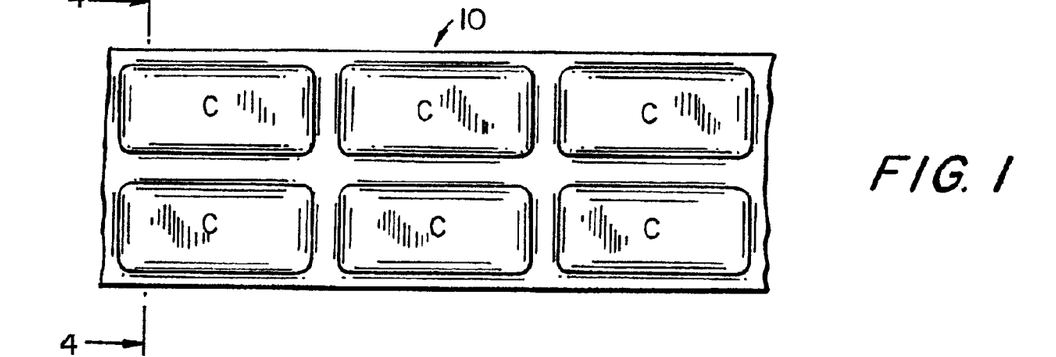
FIG. 1 is a top plan view of a position of a sheet of the multi-layered woven textile substrate unwound from a supply roll, showing multiple units of pre-configured side air curtains with air holding cavities.
Figure 2:
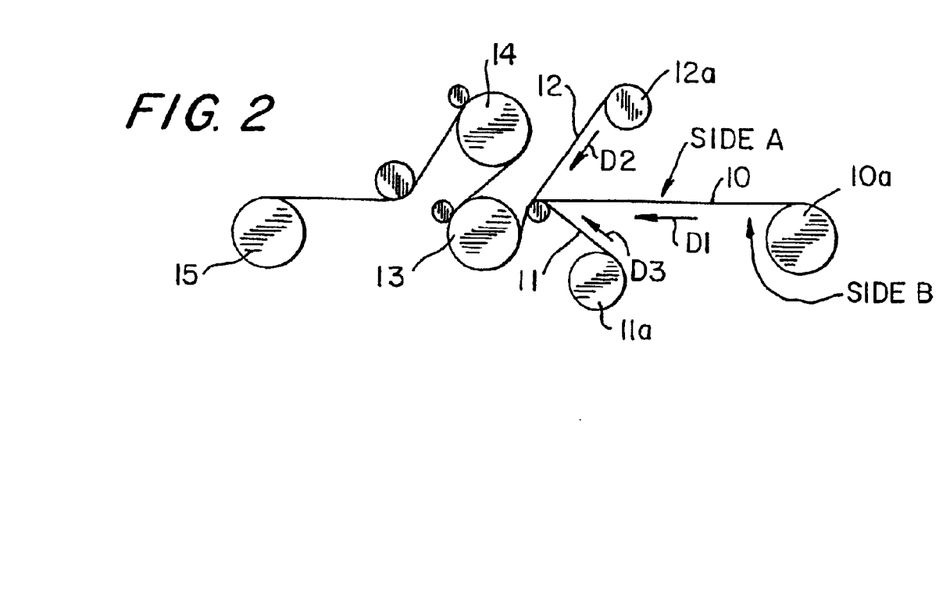
FIG. 2 is a diagramatic view from the left side of the wind, unwind, layering and heat laminating steps performed on the various materials according to one embodiment of the invention.

In one embodiment of the invention, as shown in FIG. 1, a roll of one-piece woven or non-woven multi-layered textile substrate 10, having a multiplicity of pre-configured side air curtains C, is unwound, prime-coated on both top and bottom outer surfaces, dried, without activating the isocyanate, and rewound for later film lamination, which takes place in a separate second operation. In the method of the invention, as shown in FIG. 2, a roll of pre-prime-coated, multi-layered woven or non-woven textile fabric 10 is unwound from roll 10a and pulled in direction $D_1$. Simultaneously, rolls of polyamide, polyolefin, polyester, polyether, polycarbonate or polyurethane film 11 and 12 are unwound from rolls 11a and 12a, respectively, and pulled in directions $D_2$ and $D_3$, respectively, so that they contact the textile fabric 10 on sides B and A, respectively. The film-textile-film composite is then drawn, under pressure, over hot roll 13 where Side A is film laminated first, and thereafter over hot roll 14 where Side B is film laminated. The film-textile-film laminate is then rewound at roll 15 for shipment and further processing into an automotive protective device, such as a side air curtain.

During the lamination process polymeric film laminates 11 and 12 are laminated separately and sequentially to opposite outer sides of the precoated woven or non-woven textile fabric 10. As shown in FIG. 2, film 12 is laminated under heat and pressure to side A of the textile fabric 10 by contact with hot roll 13, while film 11, which is in contact with the opposite side of the textile fabric, away from hot roll 13, is not laminated at this point in the operation. When the film-textile-film composite is pressed against hot roll 14, film 11 is pressed against heated roll 14 and becomes laminated to side B of the textile fabric at that time and place. Film lamination takes place at hot roll temperatures of from about 275° F. to about 450° F., preferably at about 350° F., and at pressures of from about 200 pounds per square inch (psi) to about 1000 psi, with from about 500 psi to about 600 psi being preferred. The film laminate has a thickness of from about 0.2 mils to about 5.0 mils, with from about 0.5 mils to about 1.0 mils being preferred. It is to be understood that the sequence of film laminating steps described above is exemplary only, and variations thereof can be made to accommodate various manufacturing requirements.

Figure 3:
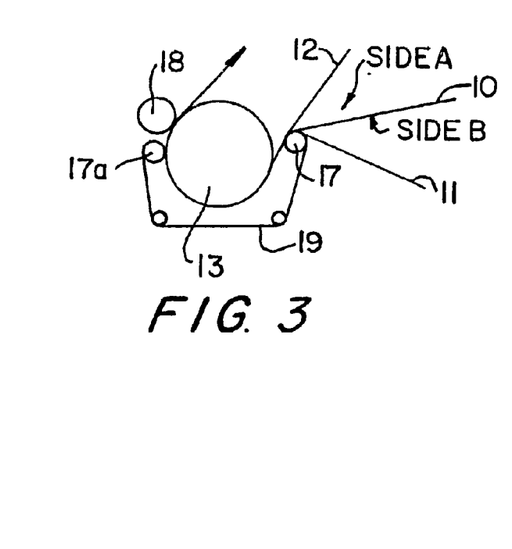
FIG. 3 is a diagramatic view of a segment of the hot lamination steps of the method of the invention.
Figure 4:
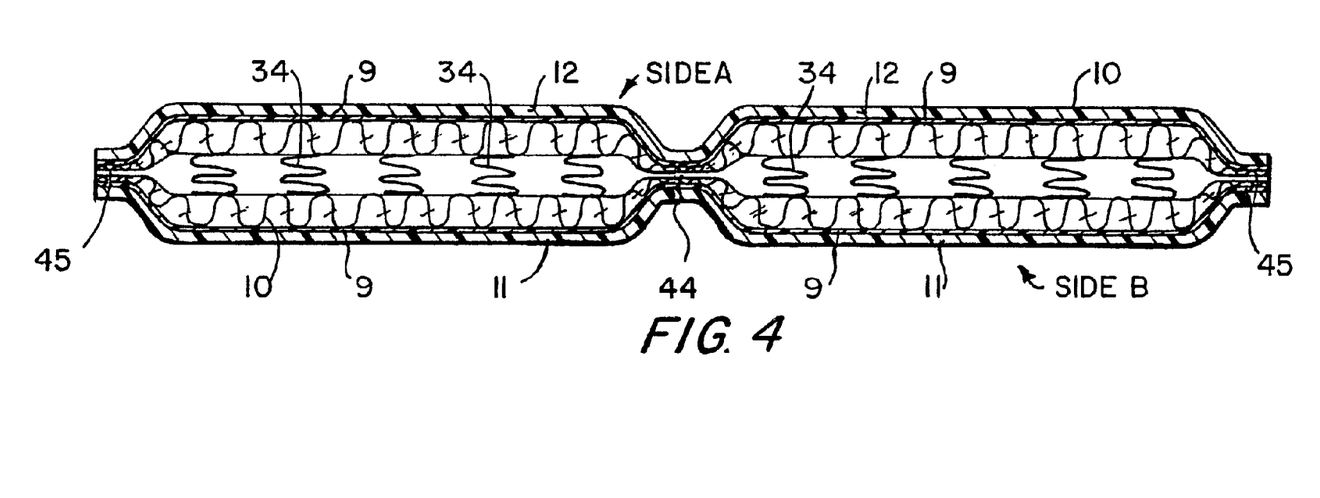
FIG. 4 is a cross-sectional view of the multi-layered, pre-configured textile substrate shown in FIG. 1 with film lamination.

Details of the hot lamination step of the method of the invention at hot roll 13 is shown in FIG. 3, where lamination of film layer 12 to side A of the textile fabric takes place. In addition to hot roll 13, the associated structure includes feed rolls 17 and 17a, high pressure roll 18, and blanket 19. Pressure is applied after the initial wrap takes place to heat-activate the prime coat, which is coated on the woven textile fabric. To prevent air bubbles from forming between the layers of film laminate 11 and side B of the textile substrate 10, endless blanket 19 extends partially around hot roll 13 to keep film layer 11 in position against side B while film 12 is being laminated. Film 11, which is separated from hot roll 13 by the woven textile at this point in the operation, is not laminated. Lamination of film 11 to side B of the textile substrate takes place at hot roll 14, shown in FIG. 2, in which there is no need for a blanket to hold the film layer as shown in FIG. 3. The multi-layered textile fabric, laminated on both sides A and B, is then wound on roll 15, shown in FIG. 2. A cross-section of the laminated multi-layered woven textile fabric taken across line 4—4 of FIG. 1 is shown in FIG. 4, wherein polymeric film coatings 11 and 12 are shown laminated on sides B and A, respectively, of textile fabric 10. The adhesive prime coat layer 9, which can be any of the above-mentioned adhesives of this invention, is shown between the film layer and the textile fabric. Suitable tethers 34 are provided to limit expansion of the fabric layers when the protective device is explosively deployed, and to maintain the desired expanded shape of the air curtain. Integrally woven connectors 44 and 45 between the multi-layered portions of the device are shown in FIG. 4.

Figure 5:
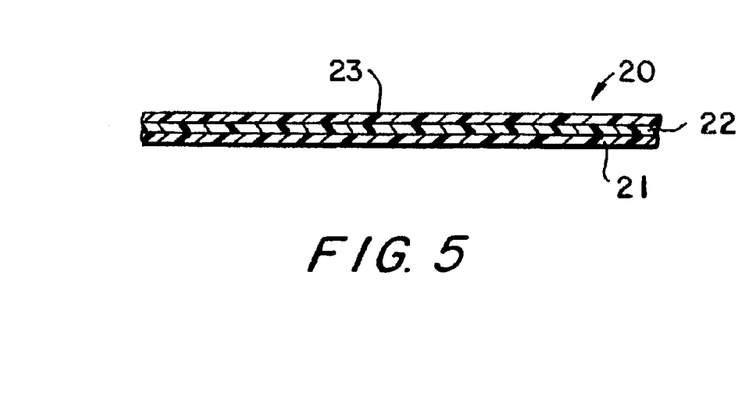
FIG. 5 is a cross-sectional view of one embodiment of the composite film laminate of the invention.

In an alternative method of the invention, a multi-layered woven or non-woven textile fabric is laminated by film transfer with a composite film structure that comprises both the polymeric film layer and the adhesive prime coat layer. In this embodiment, the composite film is applied to a textile fabric, including a single layer of woven or non-woven textile substrate or a one-piece pre-configured, multi-layered woven or non-woven textile fabric in one step rather than two, thus eliminating the need for a separate prime-coating step. As shown in FIG. 5, the composite transfer film 20 is formed by casting a solution of polyamide or aromatic or aliphatic polyether polyurethane or polyester polyurethane, a polycarbonate or polyamide material onto release paper 21. The carrier film layer 22, when solidified, becomes the film laminate of the invention, and has a thickness of from about 0.2 mils to about 5.0 mils, with from about 0.5 mils to about 1.0 mils being preferred. Typical solvents for the carrier film layer or film laminate are toluene, xylene, and dimethyl formamide (DMF). An adhesive prime coat layer 23 comprises a solution of an aliphatic or aromatic polyester or polyether polyurethane based material or a polycarbonate based aliphatic polyurethane compounded with other materials, is coated onto carrier film layer 22 after it (the film laminate) has been solidified. The prime coat layer has a thickness of from about 0.5 mils to about 5.0 mils, with from about 1.0 mils to about 1.5 mils being preferred. When the coating process has been completed and the film composite dried, the release paper is stripped away and the composite transfer film wound on a roll. It is then ready for the lamination step, at which time it is laminated to the multi-layered woven textile substrate in the manner shown in FIGS. 2 and 3. In this embodiment of the invention, there is no need to pre-primecoat the woven or non-woven, single or multi-layered textile substrate.

Figure 6:
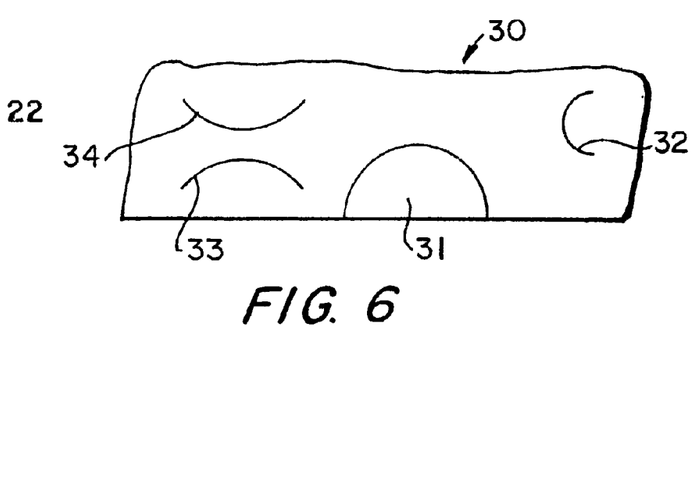
FIG. 6 is a schematic plan view of a multi-layered textile substrate with a pre-configured construction showing exemplary tethers and one exemplary dead air zone.
Figure 7:
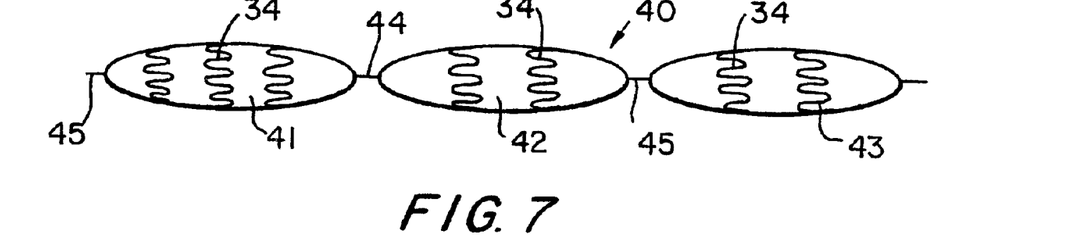
FIG. 7 is a schematic cross-sectional view of a multi-layered textile substrate of a pre-configured construction, with tethers.

The film-laminated textile substrate, when inflated, will be substantially air tight. When deployed, these protective air bags are designed to hold air during a rollover accident for the entire rollover period. When laminated in accordance with this invention, air curtains having an initial inflation pressure of about 70–75 Kpa, will hold to a minimum of about 60 Kpa for about 10 to 12 seconds after inflation. Specific air cavity designs will alter the volume of air and the amount of pressure required. These multi-layered textile substrates are designed to have different air cavity configurations and different internal tether designs as shown in FIGS. 6–9. In FIG. 6 there is shown a top plan view from the side of a multi-layered woven or non-woven textile substrate with a pre-configured construction 30 of the invention, including a dead air zone 31 (not inflatable) and internal tethers 32, 33 and 34, which maintain the air curtain's configuration and keep it from pulling apart during inflation. FIG. 7 is a cross-sectional view of a multi-layered textile substrate 40 with internal air channels 41, 42 and 43, and integrally woven connectors 44 and 45. Tethers 34 are provided to control expansion and maintain the desired shape of the air curtain.

Figure 8:
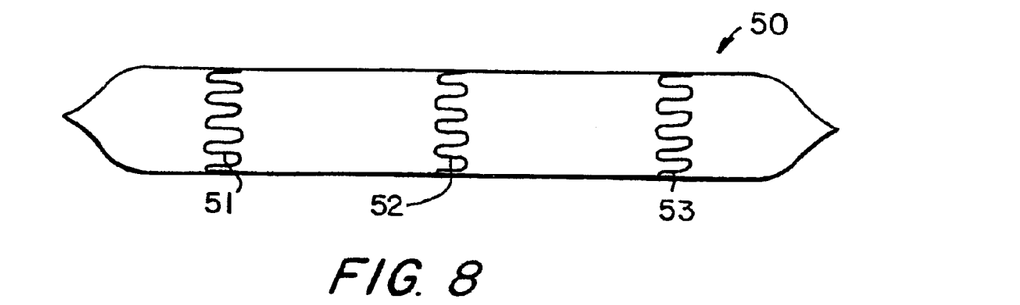
FIG. 8 is a schematic cross-sectional view of a tethered air curtain.

FIG. 8 is a cross-sectional view of a tethered side air curtain 50, showing internal tethers 51, 52 and 53 which limit the expansion of the side air curtain and maintain the shape when in the expanded state.

Figure 9:
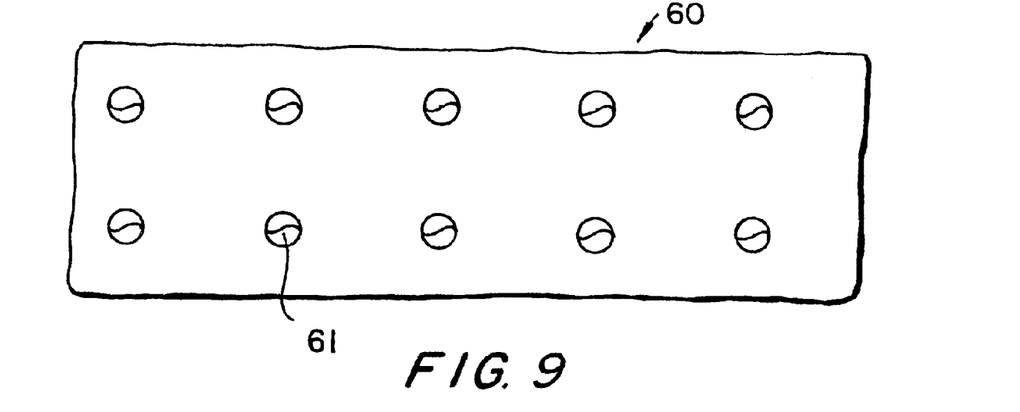
FIG. 9 is a schematic plan view of a multi-layered air curtain, illustrating another embodiment of tether.

FIG. 9 is a top plan view of a multi-layered tethered side curtain 60, having a multiplicity of tethers, such as that shown at 61. It is generally considered difficult to coat a multi-layered fabric similar to that shown in FIG. 8 with applied coating techniques or rotogravure direct coating without resulting in penetration of liquid adhesive through the textile material to the tethers. Unwanted gluing together of the tethers must be avoided because they are intended to open and expand when the bag is inflated. The air bag panels typically consist of nylon yarns of different deniers (D), such as finer deniers on the order of 235 D to 350 D or 420 D. However coarser deniers, such as 630 D and 840 D are used in those places where the tethers are attached to provide additional strength to keep the bag open while inflated and to avoid having a bag burst. Heavier denier yarns are coarser than finer deniers and the polyurethane prime coat could more easily penetrate those areas than where the finer denier yarns are used. Thus, the process in which a multi-layered composite film laminate is used permits the use of higher denier yarns, including up to 840 D, since the prime coat is overlaid on the multi-layered woven textile substrate while in the solid state. This reduces the possibility of penetration into the interior of the textile fabric and enables the bag to inflate evenly, as designed, to a specific volume and configuration.

The process described also permits the use of coarser deniers which enables the configured internal parts of the bag design to be expandable. In some cases this will produce a much better bag design that will prevent the occupants of the vehicle from impact against a pole, pavement, or window of the vehicle. These types of air curtains and air bags will have a much better resistance to occupant impact because of their pillow-like effect in performance. Further, the process enables the air bag designer to configure and locate tether designs anywhere in the desired configuration of the bag design.

What is claimed is:

1. An automotive protective device comprising a woven or non-woven textile substrate having an adhesive prime coat polyurethane layer coated on at least one surface thereof and a solid polymeric film laminated thereto.

2. The automotive protective device of claim 1 wherein said textile substrate is a nylon, polyester or other synthetic fiber.

3. The automotive protective device of claim 2 wherein said solid polymeric film laminate is a polyamide, polyolefin, polyether, polyester, polycarbonate or polyurethane film.

4. The automotive protective device of claim 2 wherein said textile substrate is a woven nylon, polyester, or other synthetic fiber.

5. The automotive protective device of claim 4 wherein said textile substrate is woven nylon.

6. The automotive protective device of claim 5 wherein said adhesive prime coat polyurethane layer is a composition comprising a polycarbonate-based aliphatic polyurethane and an isocyanate.

7. The automotive protective device of claim 5 wherein said adhesive prime coat polyurethane layer is a composition comprising: a polycarbonate-based aliphatic polyurethane; a polyester or polyether-based aliphatic polyurethane, or copolymer blends of ethylene vinyl acetate; and an isocyanate.

8. The automotive protective device of claim 6 wherein said adhesive prime coat polyurethane layer has a coating weight of from about 0.25 ounces per square yard to about 2.5 ounces per square yard.

9. The automotive protective device of claim 6 wherein said adhesive prime coat polyurethane layer has a coating weight of about 1.2 ounces per square yard.

10. The automotive protective device of claim 6 wherein said adhesive prime coat polyurethane layer has a solids content of from about 25% to about 45%.

11. The automotive protective device of claim 6 wherein said solid polymeric film laminate has a thickness of from about 0.2 mils to about 5.0 mils.

12. The automotive protective device of claim 6 wherein said solid polymeric film laminate has a thickness of from about 0.5 mils to about 1.0 mils.

13. A method of manufacturing an automotive protective device which comprises:
   a) coating the surface of a woven or non-woven textile substrate with a prime coat adhesive polyurethane layer comprising: a polycarbonate-based aliphatic polyurethane and an isocyanate; and
   b) laminating a solid polymeric film to said prime-coated surface of said textile substrate.

14. A method of manufacturing an automotive protective device which comprises:
   a) coating the surface of a woven or non-woven textile substrate with a prime coat adhesive composition comprising: a polycarbonate-based aliphatic polyurethane; a polyester or polyether-based aliphatic polyurethane, or copolymer blends of ethylene vinyl acetate; and an isocyanate.

15. The method of claim 14 wherein said textile substrate is woven nylon, polyester or other synthetic fiber.

16. A method of manufacturing an automotive protective device which comprises:
   a) taking a one-piece woven textile substrate comprising a nylon, polyester, or other synthetic fiber having two outer surfaces and pre-configured air holding cavities therein;
   b) coating each of said outer surfaces of said textile substrate with an adhesive polyurethane prime coat layer comprising: a polycarbonate-based aliphatic polyurethane and an isocyanate; and
   c) laminating a solid polymeric film to each of said outer surfaces of said textile substrate.

17. The method of claim 16 wherein said adhesive polyurethane prime coat layer is a composition comprising: a polycarbonate-based aliphatic polyurethane; a polyester or polyether-based aliphatic polyurethane, or copolymer blends of ethylene vinyl acetate; and an isocyanate.

18. The method of claim 16 wherein said woven textile substrate is nylon.

19. The method of claim 16 wherein said solid polymeric film laminate is a polyamide, polyolefin, polyester, polyether, polycarbonate or polyurethane film.

20. The method of claim 16 wherein said solid polymeric film is laminated sequentially on said outer surfaces.

21. The method of claim 16 wherein said polymeric film lamination takes place at a temperature of from about 275° F. to about 450° F. and at a pressure of from about 200 psi to about 1000 psi.

22. The method of claim 21 wherein said polymeric film lamination takes place at a temperature of about 400° F. and at a pressure of from about 500 psi to about 600 psi.

23. A composite sealing and air holding laminating film for use in the manufacture of an automotive protective device with a woven or non-woven textile substrate, said composite laminating film comprising a solid polymeric carrier film and a layer of adhesive prime coat polyurethane coated thereon.

24. The composite sealing and air holding laminating film of claim 23 wherein said solid polymeric carrier film is a polyamide, polyolefin, polyester, polyether, polycarbonate or polyurethane film.

25. The composite sealing and air holding laminating film of claim 23 wherein said adhesive prime coat polyurethane layer comprises: a polycarbonate-based aliphatic polyurethane and an isocyanate.

26. The composite sealing and air holding laminating film of claim 23 wherein said adhesive prime coat polyurethane layer is a composition comprising: a polycarbonate-based aliphatic polyurethane; a polyester or polyether-based aliphatic polyurethane, or copolymer blends of ethylene vinyl acetate; and an isocyanate.

27. The composite sealing and air holding laminating film of claim 23 wherein said adhesive prime coat polyurethane layer has a thickness of from about 0.5 mils to about 5.0 mils.

28. The composite sealing and air holding laminating film of claim 23 wherein said adhesive prime coat polyurethane layer has a thickness of from about 1.0 mils to about 1.5 mils.

29. The composite sealing and air holding laminating film of claim 23 wherein said adhesive prime coat polyurethane layer has a solids content of from about 25% to about 45%.

30. The composite sealing and air holding laminating film of claim 23 wherein said solid polymeric carrier film has a thickness of from about 0.2 mils to about 5.0 mils.

31. The composite sealing and air holding laminating film of claim 23 wherein said solid polymeric carrier film has a thickness of from about 0.5 mils to about 1.0 mils.

32. A method of making a composite sealing and air holding laminating film for use in the manufacture of an automotive protective device which comprises:
   a) forming a carrier film layer by casting a solution of polyester, polyamide, polyether, polyester, polycarbonate or aliphatic or aromatic polyether polyurethane or polyester polyurethane and a solvent onto a release paper;
   b) solidifying said carrier film layer by heating to evaporate said solvent;
   c) coating an adhesive prime coat polyurethane layer onto said polymeric carrier film;
   d) heating to dry said adhesive prime coat polyurethane material; and
   e) stripping said composite laminating film from said release paper.

33. The method of claim 32 wherein said adhesive polyurethane prime coat layer comprises: a polycarbonate-based aliphatic polyurethane and an isocyanate.

34. The method of claim 32 wherein said adhesive polyurethane prime coat layer comprises: a polycarbonate-based aliphatic polyurethane; a polyester or polyether-based aliphatic polyurethane, or copolymer blends of ethylene vinyl acetate; and an isocyanate.

35. The method of claim 32 wherein said polymeric carrier film layer has a thickness of from about 0.2 mils to about 5.0 mils.

36. The method of claim 32 wherein said polymeric carrier film layer has a thickness of from about 0.5 mils to about 1.0 mils.

37. The method of claim 32 wherein said adhesive prime coat polyurethane layer has a thickness of from about 0.5 mils to about 5.0 mils.

38. The method of claim 32 wherein said adhesive prime coat polyurethane layer has a thickness of from about 1.0 mils to about 1.5 mils.

39. An automotive protective device comprising a one-piece woven textile substrate having two outer surfaces and pre-configured air holding cavities woven therein, each of said outer surfaces having an adhesive polycarbonate-based aliphatic polyurethane prime coat layer and a solid polymeric film laminated to each of the outer surfaces of said woven textile substrate.

40. The automotive protective device of claim 39 wherein said woven textile substrate is a nylon, polyester or other synthetic fiber.

41. The automotive protective device of claim 39 wherein said solid polymeric film laminate is a polyamide, polyolefin, polyester, polyether, polycarbonate or polyurethane film.

42. The automotive protective device of claim 39 wherein said textile substrate is woven nylon.

43. The automotive protective device of claim 39 wherein said adhesive polyurethane prime coat layer comprises: a polycarbonate-based aliphatic polyurethane; a polyester or polyether-based aliphatic polyurethane, or copolymer blends of ethylene vinyl acetate; and an isocyanate.

44. The automotive protective device of claim 43 wherein said adhesive prime coat polyurethane coating layer has a thickness of from about 0.5 mils to about 5.0 mils.

45. The automotive protective device of claim 43 wherein said adhesive prime coat polyurethane coating layer has a thickness of from about 1.0 mils to about 1.5 mils.

46. The automotive protective device of claim 43 wherein said adhesive prime coat polyurethane coating layer has a solids content of from about 25% to about 45%.

47. The automotive protective device of claim 43 wherein said polymeric film laminate has a thickness of from about 0.2 mils to about 5.0 mils.

48. The automotive protective device of claim 43 wherein said polymeric film laminate has a thickness of from about 0.5 mils to about 1.0 mils.

* * * * *